though the pregnane or 19-norpregnane series, having a 3-keto substituent. In addition, the various substituents which characterize the cortical hormones such as 11-keto, 11-hydroxy, 14α-hydroxy, 9-fluoro or chloro, a double bond between C–4 and C–5 and/or a double bond between C–1 and C–2.

Typical compounds which may be subjected to the reaction to give highly useful products are those which may be exemplified by the following formula:

2,874,154

PROCESS FOR THE PRODUCTION OF 20-KETO-21-IODO STEROIDS

Gilbert Stork, Leonia, N. J., and Howard J. Ringold, Franz Sondheimer, and George Rosenkranz, Mexico City, Mexico, assignors to Syntex S. A., Mexico City, Mexico, a corporation of Mexico No Drawing. Application October 11, 1955
Serial No. 539,918

Claims priority, application Mexico October 15, 1954

14 Claims. (Cl. 260—239.55)

The present invention relates to a novel method for the production of cyclopentanophenanthrene compounds.

More particularly, the present invention relates to a novel process for the production of 21-iodo compounds of the pregnane or 19-norpregnane series having a keto group at C–20.

In U. S. Patent No. 2,596,562 of Kaufmann, Rosenkranz and Pataki, granted May 13, 1952, there is disclosed a method for the conversion of steroidal 21-iodo-17α-hydroxy 20-ketones and the corresponding 21-hydroxy or 21-acyloxy compounds by bromination at C–21 followed by reaction with an alkali metal iodide to produce the corresponding 21-iodo compounds and further followed by the reaction of the iodo compound with alkali metal acylate such as potassium acetate to prepare the corresponding 21-acyloxy derivative. The method described in this patent in general is most suitable for the reaction upon compounds free from active hydrogens elsewhere in the molecule and is not economically desirable for reaction with steroidal Δ⁴-3-ketones, for example, since in such compounds the bromination at C–21 is accompanied by simultaneous bromination at positions C–2 and C–6 of the molecule and/or by addition of bromine to the double bond.

In accordance with the present invention, the surprising discovery has been made that in the presence of an inorganic alkali, steroidal compounds of the pregnane series having the —CO,CH₃ side chain at C–17 may be reacted directly with iodine to produce in good yields the corresponding 21-iodo compounds. It has been further discovered, in accordance with the present invention, that the reaction is especially applicable to steroidal compounds having ring A unsaturation such as the Δ⁴ grouping or the Δ¹,⁴ group as well as a 3-keto group. The steroidal nucleus may be further substituted as by 11-keto or 11-hydroxy, 14-hydroxy, 9-fluoro, etc. An especially desirable group of compounds for the reaction of the present invention are those also having a 17α hydroxy substituent or the equivalent 16,17-oxido group which may be readily converted into 17α-hydroxy by known methods.

The reaction of the present invention may be exemplified generally by the following equation:

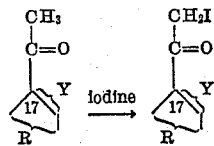

In the above equation, Y may represent hydrogen at C–17 or an α-hydroxy group at C–17, or an oxido group attached to C–16 and C–17. R then represents the balance of a cyclopentanophenanthrene nucleus and especially the type of nucleus characterizing the pregnane series or the 19-norpregnane series, having a 3-keto sub-

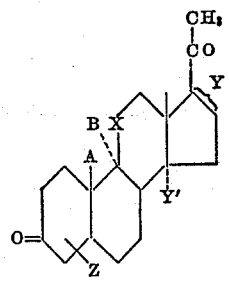

In the above formula A may be methyl (CH₃) or hydrogen (H); B may be hydrogen, chlorine or fluorine. X may be CH₂, CH—OH, CH . . . OH or C=O; Y may represent a C–17 hydrogen, a 16–17 oxido group, or a C–17 hydroxy group. Y' may be hydrogen or hydroxy. Z designates either a saturated ring A or ring A double bonds between C–1 and C–2 and/or C–4 and C–5. Typical compounds within the above definition which may be subjected to the reaction as hereinafter set forth are Δ⁴-pregnen-3,20-dione (progesterone), Δ⁴-pregnene-17α-ol-3,20-dione, 16α,17α-oxido-Δ⁴-pregnene-3,20-dione, 19-nor Δ⁴-pregnen-17α-ol-3,20-dione, Δ¹,⁴-pregnadiene-17α-ol-3,20-dione, Δ¹,⁴-pregnadiene-17α-ol-3,11,20-dione, 11α-hydroxy progesterone 11-keto progesterone, 11α,17α-dihydroxy progesterone, 11-keto 17α-hydroxy progesterone etc.

In practicing the process of the present invention, the steroid is dissolved in a suitable organic solvent which should be inert and of a non-ketonic type such as tetrahydrofuran, dimethylformamide or dioxane, having admixed therewith a minor proportion of a lower aliphatic alcohol such as methyl, ethyl or propyl alcohol. To the solution of the steroid there can be then added in any order an inorganic alkali and iodine. Especially desirable inorganic alkalis are the oxides or hydroxides, or salts of alkali metals and alkaline earth metals, as, for example, sodium hydroxide, potassium hydroxide, calcium oxide or sodium carbonate. The amount of alkali can be varied within wide limits but preferably an amount of alkali amounting from 4 to 6 molar equivalents based upon the amount of steroid is used. In general, an amount of iodine is utilized in slight excess of one molar equivalent, 1.5 molar equivalents being especially suitable, and satisfactory amounts being between 1 and 3 molar equivalents. In view of the selective nature of the reaction, it is understandable that a great excess of iodine can give rise to undesirable side reactions.

The alkali can be added to the steroid solution either in solid form, as in the case of calcium oxide, or in solution in water, a 10% aqueous sodium hydroxide solution being utilized, for example.

In general, the reaction is found to be complete within a period of time of about 2 hours or less, at room temperatures (20° C.) or lower. Where an inorganic alkali such as sodium hydroxide in aqueous solution is used, an especially desirable temperature for the reaction lies between —10° C. and +10° C., 0° C. or just below being especially favorable. In such instances the aqueous sodium hydroxide solution is added, after the iodine has been added, dropwise over a period of about 20 minutes, until the color of iodine had disappeared. The reaction mixture is then poured into cold water which causes the precipitation of the crude 21-iodo compound.

Where a solid inorganic alkali such as calcium oxide is used, it does not dissolve in the reaction mixture so that the reaction takes place under heterogeneous conditions, the calcium oxide and iodine can be added together or one after the other in their entire quantities, and the reaction mixture is then stirred at room temperature until the iodine color has disappeared. This takes a period of time of approximately 2 hours. The reaction mixture is then poured into water, preferably containing acetic acid and sodium thiosulfate. The 21-iodo compound precipitates and can be filtered from the reaction mixture. In any event, the resultant crude 21-iodo compound can be treated directly with, for example, potassium acetate in accordance with the method set forth in the aforementioned Patent No. 2,596,562 to prepare the corresponding 21-acyloxy compound.

The following specific examples serve to illustrate but are not intended to limit the present invention:

*Example I*

1 g. of $\Delta^4$-pregnen-17$\alpha$-ol-3,20-dione (17$\alpha$-hydroxyprogesterone) was dissolved in a mixture of 15 cc. of tetrahydrofuran and 2.5 cc. of methanol. The mixture was cooled at a temperature between 0° and —4° C. and treated with 1.5 g. of iodine. Maintaining the temperature constant between the same limits, and under stirring, there was added approximately 10 cc. of a 10% aqueous sodium hydroxide solution, drop by drop until the color of iodine had disappeared, which took approximately 20 minutes. The mixture was poured into water, the precipitate was collected, well washed with water and dried under vacuum at room temperature.

A sample of this product was crystallized from methanol, thus giving the analytical sample of 21-iodo-17$\alpha$-hydroxy-progesterone with a melting point of 128°–130° C. (dec.).

The crude 21-iodo compound was dissolved in 50 cc. of acetone, the solution was mixed with 3 g. of anhydrous potassium acetate and the mixture was refluxed for 16 hours. The solvent was evaporated, water was added to the residue and the crude precipitate was filtered, dried and crystallized from acetone, thus affording 560 mg. of the acetate of $\Delta^4$-pregnene-17$\alpha$,21-diol-3,20-dione (acetate of Reichstein's substance S) with a melting point of 231°–233° C., identical to an authentic sample.

*Example II*

1 g. of 16$\alpha$,17$\alpha$-oxido-$\Delta^4$-pregnene-3,20-dione (oxidoprogesterone, prepared in accordance with the method of Julian et. al., J. A. C. S. 72, 369, 1950), was treated as described in Example I. The crude 21-iodo compound was not purified, but directly treated with potassium acetate in acetone. The crude product could not be crystallized, but by paper chromatography it was possible to identify the acetate of 16$\alpha$,17$\alpha$-oxido-$\Delta^4$-pregnen-21-ol-3,20-dione, which had the same characteristics as a sample prepared by the method of Julian et al. (J. A. C. S. 72, 5146, 1950). Besides such substance, the chromatogram showed the presence of some unchanged starting material and of some other unidentified products.

*Example III*

1 g. of 19-nor-$\Delta^4$-pregnen-17$\alpha$-ol-3,20-dione (19-nor-17$\alpha$-hydroxy-progesterone), obtained in accordance with the method described in United States application of Djerassi, Sondheimer and Rosenkranz, Serial No. 425,310, filed April 23, 1954, now U. S. Patent No. 2,781,365, was treated with 15 cc. of tetrahydrofuran, 2.5 cc. of methanol and 1.5 g. of iodine at 0° C. under exactly the same conditions as described in the previous example. 7 cc. of aqueous sodium hydroxide solution was necessary to effect the decoloration of the solution at the end of 20 minutes. Following the method described in the previous example, there was obtained, after on recrystallization from acetone, 370 mg. of the acetate of 19-nor-$\Delta^4$-pregnene-17$\alpha$,21-diol-3,20-dione with melting point of 243°–246° C. (Fisher block) or 236°–239° C. (sulfuric acid bath), $[\alpha]_D$ +90° (chloroform). By hydrolysis and crystallization from ether-pentane there was obtained 19-nor-$\Delta^4$-pregnene-17$\alpha$,21-diol-3,20-dione (19-nor S) an active cortical hormone.

*Example IV*

1 g. of progesterone was treated by the procedure described in Example I. Paper chromatography of the reaction product showed the presence of the acetate of $\Delta^4$-pregnen-21-ol-3,20-dione (DOCA) of unchanged progesterone and of several unidentified products.

*Example V*

1 g. of $\Delta^4$-pregnene-11$\beta$,14$\alpha$,17$\alpha$-triol-3,20-dione, prepared according to United States Patent No. 2,702,812, were treated with 15 cc. of tetrahydrofuran, 2.5 cc. of methanol and 1.3 g. of iodine at 0° C. according to the method described in Example I. 7 cc. of aqueous sodium hydroxide were necessary in order to achieve decolorization of the solution in the course of 20 minutes. Following the method described in Example I, there were obtained the intermediate corresponding 21-iodo derivative and after further reaction and recrystallization from acetone, 370 mg. of $\Delta^4$-pregnene-11$\beta$,14$\alpha$,17$\alpha$,21-tetrol-3,20-dione with a melting point of 223°–225° C. (14$\alpha$-hydroxy derivative of Kendall's Compound F) an active cortical hormone having properties similar to Compound F.

*Example VI*

Progesterone (4.0 g.) was dissolved in a mixture of tetrahydrofuran (30 ml.) and methanol (18 ml.), then treated with calcium oxide (6.0 g. C. P.) and finally 6.0 g. iodine. The mixture was stirred at room temperature until the solution became very pale yellow, (the CaO was allowed to settle before judging the color of the solution). With stirring, the mixture was poured into ice water containing 18 cc. acetic acid and 2 g. sodium thiosulfate, and stirring was continued for about 10–15 minutes. The precipitate was allowed to settle, the solution decanted, and finally the precipitate was filtered and washed with water. The iodo compound thus obtained melted with decomposition at about 100° C. after air drying. The total iodo compound was dissolved (or suspended) in 100 ml. anhydrous acetone, treated with 8 g. anhydrous potassium acetate and the mixture boiled for 18 hours under anhydrous conditions. The acetone was completely removed at atmospheric pressure and water added to the residue yielding an oil which was taken up in methylene dichloride if it was not possible to decant the water completely. The methylene dichloride was removed at atmospheric pressure, the residue treated with 50 ml. methanol and a solution of 1 g. NaHSO$_3$ in 10 cc. water. The mixture was boiled for 15 minutes, the methanol removed in vacuo and ice and water added yielding an oil which slowly solidified. This solid was filtered and crystallized from 80% acetone-water, yielding 1.8 g. DOCA, melting point 154°–162° C. $[\alpha]_D$ +160° (CHCl$_3$).

Chromatography of the mother liquors furnished 560 mg. recovered progesterone of melting point 116°–125° C.

*Example VII*

2 g. of 17$\alpha$-hydroxy progesterone was dissolved in a mixture of 15 cc. tetrahydrofuran and 9 cc. of methanol. To this solution was added 3 g. of calcium oxide and 3 g. of iodine. The reaction mixture was stirred until the iodine color disappeared (approximately 2 hours). The reaction mixture was then poured into 2 l. of water containing 9 cc. of acetic acid and 2 g. of sodium thiosulfate and the precipitated iodo compound filtered and air dried. 2.73 g. of the 21-iodo derivative of 17$\alpha$-hydroxy progesterone having a decomposition temperature of approximately 120° C. was obtained.

The iodo compound thus obtained was dissolved in 100 cc. of boiling anhydrous acetone and boiled overnight with 8 g. of anhydrous acetate in suspension. The product was evaporated to dryness, water was added and the crude "S" acetate crystallized from acetone amounted to 1.3 g. having a melting point of 222°–226° C. The mother liquors from the previous step were boiled for 15 minutes in a mixture of 15 cc. of methanol, 5 cc. of water and 1 g. of $NaHSO_3$, then evaporated to dryness in a vacuum, precipitated with water, filtered, and the product crystallized from acetone thus giving an additional 0.19 g. of melting point 222°–226° C.

*Example VIII*

4 g. of $\Delta^{1,4}$-pregnadiene-17α-ol-3,20-dione was treated as set forth in Example VII except that the treatment with $NaHSO_3$ was omitted. The resultant product was the acetate of the active cortical hormone $\Delta^{1,4}$-pregnadiene-17α,21-diol-3,20-dione.

We claim:

1. A process for the production of steroidal 20-keto 21-iodo compounds selected from the group consisting of pregnenes and 19-norpregnenes comprising reacting the corresponding 21-unsubstituted steroid with iodine in the presence of an inert organic non-ketonic solvent including a minor proportion of a lower aliphatic alcohol and an inorganic alkali.

2. The process of claim 1 wherein the inorganic alkali is a compound selected from the group consisting of oxides, salts and hydroxides of the alkali metals and alkaline earth metals.

3. The process of claim 1 wherein the steroidal compound is a 17-hydroxy compound.

4. The process of claim 1 wherein the steroidal compound is a 3-keto 17-hydroxy ring A unsaturated compound.

5. The process of claim 1 wherein the steroidal compound is a 16α-17α-oxido compound.

6. A process for the production of steroidal 20-keto 21-iodo compounds selected from the group consisting of pregnenes and 19-norpregnenes comprising reacting the corresponding 21-unsubstituted steroid with iodine in the presence of a mixture of a minor amount of a lower aliphatic alcohol and an organic solvent selected from the class consisting of tetrahydrofuran, dimethyl formamide and dioxane and an inorganic alkali.

7. The process of claim 6 wherein the inorganic alkali is sodium hydroxide and the inert organic solvent is tetrahydrofuran in admixture with a minor proportion of methyl alcohol.

8. The process of claim 6 wherein the inorganic alkali is calcium oxide and the inert organic solvent is tetrahydrofuran in admixture with a minor proportion of methyl alcohol.

9. A process for the production of the 21-iodo derivative of $\Delta^4$-pregnene-17α-ol-3,20-dione which comprises reacting $\Delta^4$-pregnene-17α-ol-3,20-dione with iodine in the presence of an inert organic non-ketonic solvent including a minor proportion of a lower aliphatic alcohol and an inorganic alkali.

10. A process for the production of the 21-iodo derivative of $\Delta^4$-pregnene-3,20-dione which comprises reacting $\Delta^4$-pregnene-3,20-dione with iodine in the presence of an inert organic non-ketonic solvent including a minor proportion of a lower aliphatic alcohol and an inorganic alkali.

11. A process for the production of the 21-iodo derivative of 19-nor-$\Delta^4$-pregnene-17α-ol-3,20-dione which comprises reacting 19-nor-$\Delta^4$-pregnene-17α-ol-3,20-dione with iodine in the presence of an inert organic non-ketonic solvent including a minor proportion of a lower aliphatic alcohol and an inorganic alkali.

12. A process for the production of the 21-iodo derivative of 16α,17α-oxido-$\Delta^4$-pregnene-3,20-dione which comprises reacting 16α,17α-oxido-$\Delta^4$-pregnene-3,20-dione with iodine in the presence of an inert organic non-ketonic solvent including a minor proportion of a lower aliphatic alcohol and an inorganic alkali.

13. A process for the production of the 21-iodo derivative of $\Delta^4$-pregnene-11β,14α,17α-triol-3,20-dione which comprises reacting $\Delta^4$-pregnene-11β,14α,17α-triol-3,20-dione with iodine in the presence of an inert organic non-ketonic solvent including a minor proportion of a lower aliphatic alcohol and an inorganic alkali.

14. A process for the production of the 21-iodo derivative of $\Delta^{1,4}$-pregnadiene-17α-ol-3,20-dione which comprises reacting $\Delta^{1,4}$-pregnadiene-17α-ol-3,20-dione with iodine in the presence of an inert organic non-ketonic solvent including a minor proportion of a lower aliphatic alcohol and an inorganic alkali.

References Cited in the file of this patent

UNITED STATES PATENTS

| | | |
|---|---|---|
| 2,554,472 | Ruschig | May 22, 1951 |
| 2,554,473 | Ruschig | May 22, 1951 |
| 2,609,379 | Ruschig | Sept. 2, 1952 |

OTHER REFERENCES

Houben: "Die Methoden der Organische Chemie," Dritte Auflage, 1930, pages 1172, 1176, 1177.